United States Patent
Little et al.

(10) Patent No.: US 10,100,737 B2
(45) Date of Patent: Oct. 16, 2018

(54) IMPINGEMENT COOLING ARRANGEMENT HAVING A SNAP-IN PLATE

(71) Applicants: David A. Little, Chuluota, FL (US); Clifford E. Johnson, Orlando, FL (US)

(72) Inventors: David A. Little, Chuluota, FL (US); Clifford E. Johnson, Orlando, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 1488 days.

(21) Appl. No.: 13/895,831

(22) Filed: May 16, 2013

(65) Prior Publication Data

US 2017/0211479 A1   Jul. 27, 2017

(51) Int. Cl.
| F23R 3/00 | (2006.01) |
| F02C 7/18 | (2006.01) |
| F01D 9/02 | (2006.01) |

(52) U.S. Cl.
CPC ............ *F02C 7/18* (2013.01); *F01D 9/023* (2013.01); *F23R 3/002* (2013.01); *F05D 2260/201* (2013.01); *F23R 2900/03042* (2013.01); *F23R 2900/03044* (2013.01)

(58) Field of Classification Search
CPC .. F23R 2900/03044; F23R 2900/03042; F05D 2260/201; F05D 2260/22141; F01D 25/14; F01D 9/023; F02C 7/18
See application file for complete search history.

(56) References Cited

U.S. PATENT DOCUMENTS

| 3,628,880 | A | * | 12/1971 | Smuland | F01D 5/189 |
| | | | | | 415/175 |
| 3,910,039 | A | | 10/1975 | Fortini | |
| 4,118,146 | A | | 10/1978 | Dierberger | |
| 4,573,865 | A | | 3/1986 | Hsia et al. | |
| 4,642,024 | A | * | 2/1987 | Weidner | F01D 11/08 |
| | | | | | 415/116 |
| 4,712,979 | A | * | 12/1987 | Finger | F01D 5/081 |
| | | | | | 415/115 |
| 4,719,748 | A | * | 1/1988 | Davis, Jr. | F01D 5/187 |
| | | | | | 60/39.37 |
| 5,116,199 | A | | 5/1992 | Ciokajlo | |
| 5,165,847 | A | * | 11/1992 | Proctor | F01D 11/08 |
| | | | | | 415/115 |
| 5,265,409 | A | | 11/1993 | Smith, Jr. et al. | |
| 5,333,443 | A | | 8/1994 | Halila | |
| 5,391,052 | A | | 2/1995 | Correia et al. | |
| 5,480,281 | A | | 1/1996 | Correia | |
| 5,596,870 | A | | 1/1997 | Dillard et al. | |

(Continued)

FOREIGN PATENT DOCUMENTS

| CN | 102588013 A | 7/2012 |
| EP | 2366873 A2 | 9/2011 |

*Primary Examiner* — Gerald L Sung
*Assistant Examiner* — Marc Amar

(57) ABSTRACT

A cooling arrangement (100), including: a substrate having a pocket (24) defined by a rib side surface (28) and a bottom surface (26); a feature (112) formed in the rib side surface; and an impingement plate (102). In an installed configuration (116) a resilience of the impingement plate enables an interference between the impingement plate and the feature that locks the impingement plate in an installed position (118). An elastic compression of the impingement plate from the installed configuration eliminates the interference.

9 Claims, 2 Drawing Sheets

(56) References Cited

U.S. PATENT DOCUMENTS

| | | | |
|---|---|---|---|
| 5,598,697 A | 2/1997 | Ambrogi et al. | |
| 5,634,766 A | 6/1997 | Cunha et al. | |
| 5,772,400 A * | 6/1998 | Pellow | F01D 11/24 415/173.1 |
| 5,782,294 A | 7/1998 | Froemming et al. | |
| 5,823,741 A | 10/1998 | Predmore et al. | |
| 6,089,822 A | 7/2000 | Fukuno | |
| 6,126,389 A | 10/2000 | Burdgick | |
| 6,386,825 B1 | 5/2002 | Burdgick | |
| 6,402,466 B1 | 6/2002 | Burdgick et al. | |
| 6,508,623 B1 * | 1/2003 | Shiozaki | F01D 9/04 415/115 |
| 6,632,070 B1 | 10/2003 | Tiemann | |
| 6,647,624 B2 | 11/2003 | Fried et al. | |
| 6,659,714 B1 * | 12/2003 | Tiemann | F01D 5/188 415/115 |
| 6,659,716 B1 | 12/2003 | Laurello et al. | |
| 7,093,439 B2 | 8/2006 | Pacheco-Tougas et al. | |
| 7,140,185 B2 | 11/2006 | Burd | |
| 7,607,855 B2 | 10/2009 | Bosley et al. | |
| 7,665,962 B1 | 2/2010 | Liang | |
| 8,033,119 B2 | 10/2011 | Liang | |
| 8,104,292 B2 | 1/2012 | Lee et al. | |
| 8,118,546 B2 | 2/2012 | Morrison | |
| 8,123,466 B2 | 2/2012 | Pietraszkiewicz et al. | |
| 8,251,637 B2 | 8/2012 | Lewis et al. | |
| 8,276,391 B2 | 10/2012 | Berry et al. | |
| 8,281,598 B2 | 10/2012 | Gerendas et al. | |
| 8,292,573 B2 | 10/2012 | Broomer et al. | |
| 2002/0098079 A1 * | 7/2002 | Fujikawa | F01D 9/00 415/116 |
| 2004/0047725 A1 * | 3/2004 | Tomita | F01D 11/005 415/116 |
| 2005/0123405 A1 * | 6/2005 | Ono | F01D 11/005 416/248 |
| 2008/0018346 A1 | 5/2008 | Liang | |
| 2011/0188993 A1 * | 8/2011 | Bacha | F01D 11/24 415/115 |
| 2011/0229305 A1 * | 9/2011 | Bergman | F01D 9/041 415/115 |
| 2012/0121381 A1 * | 5/2012 | Charron | F01D 9/023 415/115 |
| 2012/0128498 A1 | 5/2012 | Basiletti et al. | |
| 2012/0177478 A1 | 7/2012 | Giri et al. | |
| 2012/0272521 A1 | 11/2012 | Lee et al. | |
| 2013/0031914 A1 * | 2/2013 | Lee | F01D 5/186 60/806 |
| 2013/0074471 A1 * | 3/2013 | Khan | F23R 3/06 60/39.24 |
| 2014/0144146 A1 * | 5/2014 | Penz | F23R 3/007 60/753 |

\* cited by examiner

IMPINGEMENT COOLING ARRANGEMENT HAVING A SNAP-IN PLATE

STATEMENT REGARDING FEDERALLY SPONSORED DEVELOPMENT

Development for this invention was supported in part by Contract No. DE-FC26-05NT42644, awarded by the United States Department of Energy. Accordingly, the United States Government may have certain rights in this invention.

FIELD OF THE INVENTION

The invention relates to a cooling arrangement for a gas turbine engine component. In particular, this invention includes impingement cooling of surfaces within a pocket and improved convective cooling of the geometry defining the pocket.

BACKGROUND OF THE INVENTION

Typical current gas turbine engines may combust fuel and air at temperatures exceeding 2500 degrees Fahrenheit. These combustion gases may be ignited and burned in a combustion chamber, ducted to a turbine inlet, and guided through the turbine via guide vanes in order to turn rotor blades that extract energy from the combustion gases. The materials that form these hot gas path components are often at the limits of their thermal capacity and must be cooled to prolong their service life.

Impingement cooling is one form of cooling where a stream of cooling fluid is directed toward a surface to be cooled. The stream (or jet) may be formed by a sheet set apart from the surface to be cooled and having impingement orifices. A higher pressure on an outer side of impingement sheet drives the cooling fluid through the impingement orifice, thereby forming jets that impinge the surface to be cooled at angles up to and including perpendicular to the surface to be cooled. However, increasing temperatures of combustion continue to push the limits of the components and cooling arrangements, and this leaves room for improvement in the art.

BRIEF DESCRIPTION OF THE DRAWINGS

The invention is explained in the following description in view of the drawings that show.

DETAILED DESCRIPTION OF THE INVENTION

Figure 1:
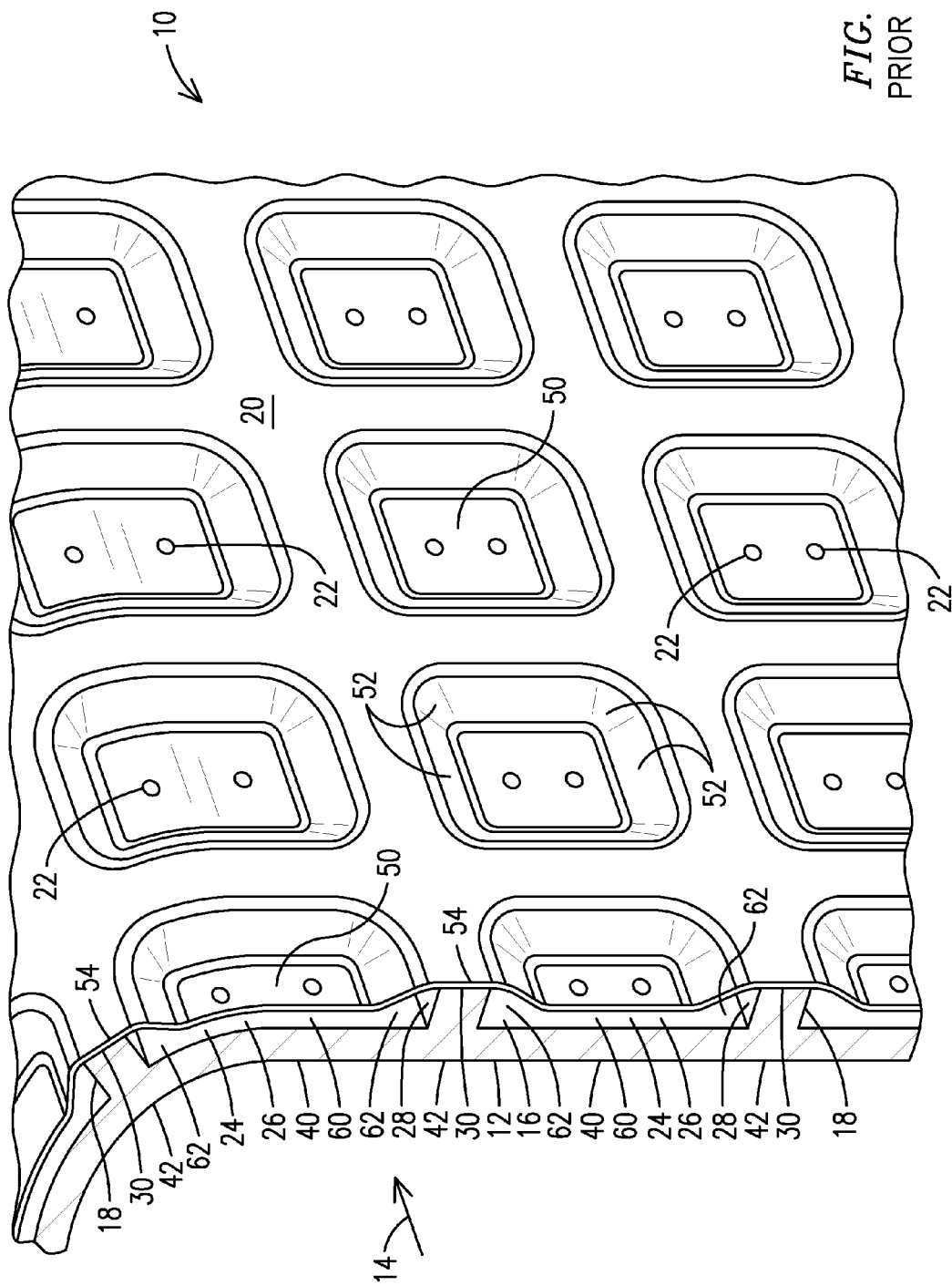
FIG. 1 is a sectional view of a prior art component.

The present inventors have devised a clever, yet simple impingement apparatus that provides sufficient impingement cooling of surfaces of relatively deep pockets on a cool side of a component. Through the impingement effect the cooled surface is better able to cool a relatively hot side of the component through conduction. The arrangement further provides improved cooling of ribs or other features that define the pocket and provide structural support for the component, and this enhanced conductive cooling also better cools the hot side under the structural rib. Specifically, the inventors have devised an impingement arrangement that utilizes a snap-in impingement plate that can be installed and removed in the pocket next to the surface to be impingement cooled without damage to the impingement plate and without disassembly of the component. With the impingement plate lowered into the pocket the structural ribs are left exposed and better cooled by convective cooling. Through conduction the convectively cooled rib, in turn, better cools a hot side of the component under the structural rib that is not able to benefit from the impingement cooling.

Emerging gas turbine engine technology includes arrangements such as those disclosed in U.S. patent publication number 2012/0121381 to Charron et al., and U.S. patent publication number 2012/0272521 to Lee et al. In this emerging technology transition ducts contain and direct combustion gases from individual can combustors to a turbine inlet while accelerating and properly orienting the combustion gas so that it leaves the transition ducts at a proper speed and orientation for delivery directly onto the first row of turbine rotor blades. This configuration eliminates the need for a row of vanes prior to the turbine inlet used in prior combustion arrangements to accelerate and orient the gases for delivery onto the first row of turbine blade.

One result of accelerating the combustion gases is a reduced static pressure in the accelerated combustion gases in the transition ducts. Since the transition ducts are disposed in a plenum full of relatively slow moving compressed air, there is a very large pressure difference across that transition duct from a static pressure of the compressed air to the static pressure of the accelerating and accelerated combustion gases. While the prior combustion arrangements accelerated the combustion gases to a similar speed, the structure of the row of vanes where this occurred was more substantial and better able to withstand the pressure difference. However, due to the high temperature caused by the relatively fast moving flow of very hot combustion gases within the transition ducts the transition ducts must remain relatively thin for thermal considerations. In order to provide structural strength sufficient to overcome the greater pressure difference, structural ribs have been used. However, these structural ribs form pockets in the transition ducts. Naturally flowing cooling air from the plenum may not flow into the pockets and cool a bottom and side surfaces of the pockets. As a result the relatively stagnant air in the pocket may heat and thus the material of the pocket may heat, thereby shortening the component's service life.

To overcome this impingement cooling has been proposed which will take advantage of the pressure difference to direct jets of impingement air into the pocket to cool a bottom of the pocket. The cooled pocket bottom will then increase conductive cooling through the component from the hot side, thereby keeping the component cooler. The impingement jets have been formed by placing a sheet across the surface of the component. This can be seen in FIG. 1, which shows a cutaway of a component 10, a transition duct in this exemplary embodiment, having a heated surface 12 guiding a flow 14 of combustion gases, a cooled surface 16 opposite the heated surface 12, structural/raised ribs 18 and a continuous sheet 20 having impingement orifices 22. The ribs 18 define pockets 24 having a bottom surface 26 and side surfaces 28. The ribs 18 have a rib top surface 30 that is covered by the continuous sheet 20. The bottom surface 26, side surfaces 28, and rib top surface 30 constitute a relatively cool surface, a.k.a. the cooled surface 16. A portion 40 of the heated surface 12 under the impingement cooled bottom surface 26 is conductively cooled through a component. However, a portion 42 under the ribs 18 is unable to benefit from the impingement cooling effect due to the presence of the ribs 18. Consequently, while the portion 40 under the impingement cooled bottom surface 26 and the portion 42 under the ribs 18 may be film cooled (not shown), the portion 42 under the ribs 18 is not conductively cooled as well as the portion 40 under the impingement cooled bottom surface 26. Consequently, more film cooling air must be used to compensate and/or a pattern of the film cooling arrangement must be configured to accommodate this.

The present inventors have recognized that it is possible to improve upon the heat conduction from the portion 42 under the ribs 18 by exposing the ribs to the backside cooling air. In particular, the continuous sheet 20 includes an impingement portion 50 set apart from the bottom surface 26, a support portion 52 that supports the impingement portion 50 in place, and a spanning portion 54 that abuts and spans the rib top surface 30, thereby connecting the support portions 52. Being disposed directly on the rib top surface 30 the spanning portion 54 sits between it and any cooling fluid surrounding the component 10. Thus, in order to cool the rib top surface 30 the cooling fluid must first cool the continuous sheet 20, which reduces the cooling efficiency. In addition, the sheet forms a cavity 60 into which the impingement jet flows, and spent impingement air, which has been heated, collects in a sub region 62 of the cavity 60 adjacent the side surfaces 28 of the ribs 18. Having this relatively warm spent impingement air adjacent the side surfaces 28 further inhibits cooling of the ribs 18, and in turn, inhibits cooling of the portion 42 of the heated surface 12 under the ribs 18. Together these effects result in a heated surface 12 that varies in temperature and thermal growth during the life of the gas turbine engine. Thus, in turn, reduces the life of the component. These effects likewise also occur in the component substrate itself, including the ribs 18 and the walls of the components between the heated surface 12 and the bottom surface 26, such that there are unwanted thermal gradients within the component 10.

Figure 2:
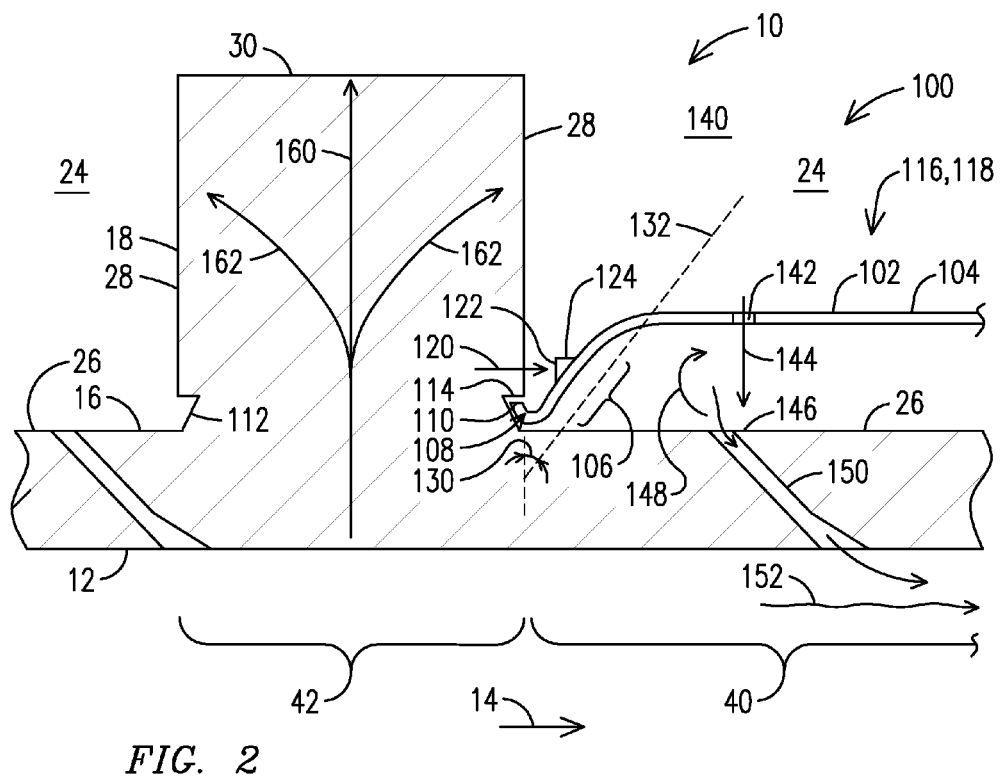
FIG. 2 is a cross section of an exemplary embodiment of an impingement arrangement.

Recognizing these effects, the present inventors have proposed an innovative cooling arrangement designed to mitigate them as shown in FIG. 2. The unique cooling arrangement 100 includes a structure similar to that of the arrangement of FIG. 1, but without the continuous sheet 20. Instead, the cooling arrangement 100 includes a discrete impingement plate 102 having an impingement portion 104. However, instead of spanning the rib top surface 30, the impingement plate 102 has a transition region 106 and a perimeter portion 108. An edge 110 of the perimeter portion fits into a interlocking feature 112 present in the side surface 28. In an exemplary embodiment the interlocking feature 112 may be a groove or slot that may extend around part or the entire perimeter of the pocket 24. Alternately, the interlocking feature may be a bump or bumps, or any feature that is capable of locking the impingement plate 102 in place. For example, a bump or bumps on opposing walls may be sufficient to hold the impingement plate 102 in place if the impingement plate 102 is formed with "legs" that extend to the bottom surface 26 in between the opposing walls to stabilize the impingement plate 102. In another example, the interlocking feature 112 could be a side surface 28 that tapers toward a center of the pocket 24.

The transition region 106 is flexible, and a resilience of the transition region 106 causes the edge 110 of the perimeter portion 108 to extend into the interlocking feature 112. A corner 114 of the feature then causes an interference with the perimeter portion 108 and thereby creates an interference such that when the impingement plate 102 is in the installed configuration 116 shown the corner 114 locks the impingement plate 102 in an installed position 118. In the installed configuration 116 the impingement plate 102 and flexible feature 112 are positioned/configured such that if the impingement plate 102 were in the installed position 118 in the pocket 24, the impingement plate 102 would be locked into place. Being installed in the pocket 24 means that at least some portion of the impingement plate 102 is within the pocket 24 delimited by the side surfaces 28 (and bottom surface 26) to form a cavity 60. For example, in the exemplary embodiment of FIG. 2, the perimeter portion 108 is disposed within the pocket 24 near the bottom surface 26 and this forms the cavity 60. Alternately, the perimeter portion 108 could be disposed closer to the top surface 30, thereby forming a larger cavity 60.

Installation and removal of the impingement plate 102 is made possible because the transition region 106 is configured to be sufficiently flexible such that when a compressive force 120 is applied on an outer surface 122 of the transition region 106 the transition region 106 will yield/bend inward toward the center of the pocket 24. In other words, the range of shapes that the impingement plate 102 can take without plastic damage include those which permit installation, operation, and removal of the impingement plate 102. The force and associated compression may occur on part or all of the perimeter portion 108 to the degree necessary within the elastic range of the transition region 106 to cause the transition region 106 to yield enough to eliminate the interference, thereby unlocking the impingement plate 102 from the installed position 118. The transition region 106 is configured to be within its elastic deformation range through all compression/flexion necessary to permit installation, operation, and removal. Consequently, the impingement plate 102 may be installed and removed at will without any need to damage the impingement plate 102 and/or the pocket 24. The impingement plate may be uniformly compressed about its perimeter portion 108 and moved into the pocket when the impingement portion 104 remains parallel to a position of the impingement portion 104 when the impingement plate 102 is in the installed position 118. Alternately, the impingement plate 102 may be tilted to ease installation etc.

An optional compression aid feature 124 may be used to engage an optional tool (not shown), which may be used to retain and compress the transition region 106. An angle 130 between an average slope 132 of the outer surface 122 and the side surface 28 may be at least 60 degrees. This configuration has been found to facilitate compression while maximizing a distance of the transition region 106 from the side surface 28. Particularly, in this configuration enough friction is created between the tool and the transition region 106 that tool will bend the transition region 106 and not slip off.

In operation cooling fluid present in a plenum 140 typically experiences a higher static pressure than the flow 14 of combustion gases. This higher pressure drives a portion of the cooling air through impingement orifices 142, thereby forming an impingement jet 144 directed toward an impinged portion 146 of the bottom surface 26 of the pocket 24. Spent impingement air 148 moves from the impinged portion 146, but instead of moving to a sub region adjacent the side surface 28, it is contained by the impingement plate 102. Eventually the spent impingement air 148 flows through a film cooling orifice 150 and joins a layer 152 of film cooling fluid effective to form a barrier between the flow 14 of combustion gases and the hot surface 12. An inherent resilience of the impingement plate 102 will permit it to accommodate thermal growth mismatch between it and the pocket 24, and hence shapes resulting from these mismatches will all be within the elastic range of the impingement plate 102.

Containing the spent impingement air 148 in this manner allows both the rib top surface 30 and the rib side surface 28 to be directly exposed to the cooling fluid in the plenum 140. This direct exposure provides improved convective cooling of these surfaces, and the improved convective cooling provides improved conductive cooling through the rib 18 along a first conductive cooling path 160 between the portion 42 under the ribs 18 and the rib top surface 30 and a second conductive cooling path 162 between the portion 42 under the ribs 18 and the side surface 28. This, in turn, better cools the portion 42 under the ribs 18, which leads to a hot surface 12 having a more uniform temperature during engine operation. This more uniform temperature distribution allows the film cooling arrangement to be configured to use less cooling air previously necessary to accommodate the hot spots that were the portion 42 under the ribs 18. Using less cooling air results in more efficient engine operation. For the above reasons configurations that expose more of the side surface 28 may be employed. For example, in the exemplary embodiment shown the interlocking feature 112 and the perimeter portion 108 are disposed near the bottom surface, leaving a majority of the side surface 28 exposed.

Figure 3:
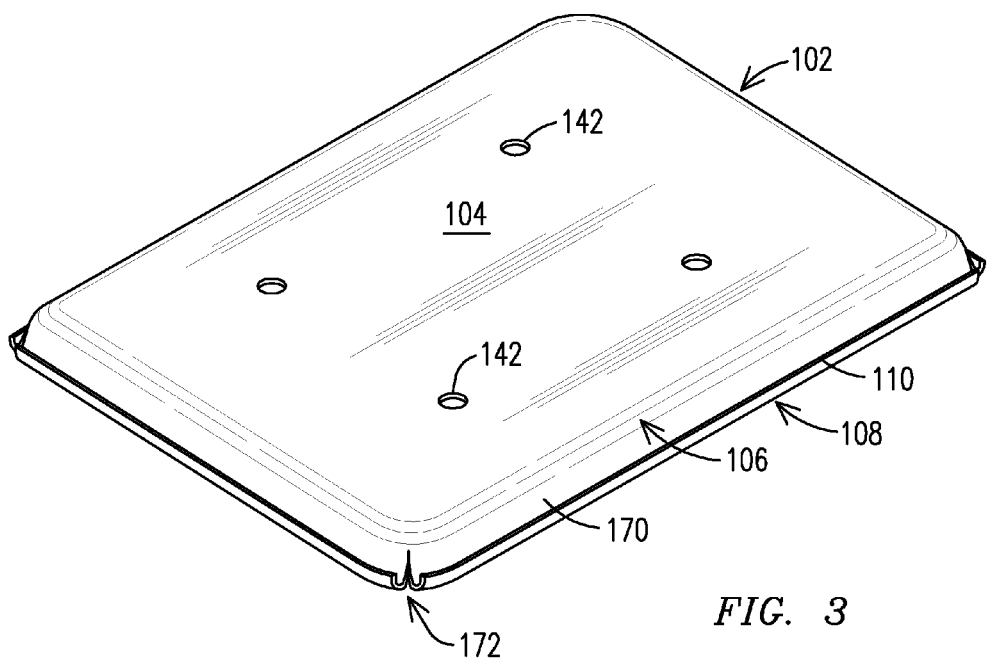
FIG. 3 is a perspective view of an exemplary embodiment of the impingement plate.

FIG. 3 shows one exemplary embodiment of the impingement plate 102. In this exemplary embodiment multiple flexible features 170 extend from the impingement portion 104, thereby forming the transition region 106 and the perimeter portion 108. Between each flexible feature 170 is a slit 172. The slit is configured to accommodate compressive flexion of the flexible features 170 so the impingement plate 102 may be compressed for insertion into the pocket 24, past the interlocking feature 112. Without the slit 172 adjacent flexible features 170 would interfere with each other and not be able to compress. When transitioning from being installed to being in the installed configuration 116 the flexible features 170 will spring outward to lock the impingement plate 102 in place. The flexible features 170 may spring out to the point where the perimeter portion 108 presses against the side surface 28 and into the interlocking feature 112. When this transition occurs the slit 172, which may disappear when the flexible features are flexed, will open a little. The size of the slit 172 may be minimal so if any cooling flow flows there through it has a minimal impact on engine efficiency and/or cooling. Alternately, should cooling be desired in corners of the pockets 24, where cooling needs may be high, the slits could be designed to provide a double role and create a path for cooling flow and/or impingement cooling flow. There may be as few as absolutely necessary or there may be more slits, depending on the particular requirements of the cooling arrangement 100 and the particular geometry of the pocket 24 to be cooled. Similarly, the flexible features 170 may be narrower than the slits 172 etc. In addition, the interlocking feature 112 may extend for the entire perimeter of the pocket 24, or it may be present only where necessary to receive an edge 110 of a flexible feature 170.

Not every pocket 24 must have the same geometry. Specifically, some pockets 24 may be flat while some may span a bend in the component 10. Consequently, some impingement plates may be flat while others may be bent to follow a contour of the bottom surface 26. Likewise, a shape of the perimeter 108 may be rectangular as shown, or triangular, or it may take on any shape necessary to accommodate the pocket 24 to be cooled. Should a component have ribs that extend circumferentially, such as a cone-shaped duct, it is possible for annular shaped impingement plates to be used. Such an impingement plate may include ends similar to a piston ring to facilitate installation and could be installed from the small end of the cone.

Each impingement plate 102 may be set apart from the bottom surface 26 by a constant amount. Alternately, an amount of distance from the bottom surface to the impingement portion 104 may vary within the pocket to permit local tailoring of the cooling effect desired. Each impingement plate 102 may be further secured in the pocket to ensure it does not come loose during operation of the gas turbine engine and cause damage by being drawing through the combustion arrangement and turbine. This additional securing may include brazing or welding the impingement plate 102 to the side surface 28.

For the foregoing it is evident that the present inventors have developed a unique cooling arrangement that improves impingement cooling in existing and emerging technology gas turbine engines. The disclosed cooling arrangement is simple and therefore relatively inexpensive, yet effective, and further reduces its own cost by improving the efficiency of the gas turbine engine. Consequently, it represents an improvement in the art.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A cooling arrangement, comprising: a substrate comprising a pocket defined by a rib side surface extending radially outward from a bottom surface; a feature formed in the rib side surface; an impingement plate, wherein in an installed configuration, a resilience of the impingement plate enables an interference between the impingement plate and the feature that locks the impingement plate in an installed position, wherein an elastic compression of the impingement plate from the installed configuration eliminates the interference permitting removal of the impingement plate; wherein the impingement plate comprises a slit to permit the elastic compression; wherein the impingement plate comprise a perimeter portion, an impingement portion, and a transition region connecting the perimeter portion and the impingement portion; wherein the perimeter portion engages with the feature formed in the rib side surface to enable the interference; wherein an average slope of an outer surface of the transition region forms an acute angle with the rib side surface of at least 60 degrees; and wherein the transition region extends from the perimeter portion in a direction radially outward from the bottom surface.

2. The arrangement of claim 1, wherein a rib comprising the rib side surface further comprises a rib top surface directly exposed to a cooling fluid above the impingement plate.

3. The arrangement of claim 2, wherein when the impingement plate is in the installed position, a majority of the rib side surface is directly exposed to the cooling fluid.

4. The arrangement of claim 1, wherein when the impingement plate is in the installed position the perimeter portion is disposed closer to the bottom surface than is the impingement portion.

5. The arrangement of claim 4, wherein the elastic compression comprises an elastic deformation of the transition region to eliminate the interference.

6. The arrangement of claim 4, wherein the impingement plate further comprises a compression aid feature.

7. The arrangement of claim 1, wherein the feature formed in the rib side surface comprises a slot extending along the rib side surface.

8. The arrangement of claim 7, wherein when in the installed position the perimeter portion of a perimeter of the impingement plate fits in the slot.

9. A gas turbine engine component comprising the cooling arrangement of claim 1.

* * * * *